Patented Mar. 16, 1943

2,314,039

UNITED STATES PATENT OFFICE 2,314,039

PROCESS FOR THE PRODUCTION OF EPOXIDE ETHERS

Theodore W. Evans, Kenneth E. Marple, and Edward C. Shokal, Oakland, Calif., assignors to Shell Development Company, San Francisco, Calif., a corporation of Delaware No Drawing. Application September 30, 1940, Serial No. 359,092

13 Claims. (Cl. 260—348)

This invention relates to a novel process for the production of epoxide ethers. More particularly, the invention is concerned with a process wherein halohydrin ethers are treated so as to produce high yields of epoxide ethers. In one of its specific embodiments, the invention is directed to a novel process for the efficient and economic production of glycidyl ethers. The invention is further directed to a novel class of epoxide ethers which may be obtained by the process of the present invention.

It is known that epoxide ethers may be produced by introducing the corresponding halohydrin ether into a boiling aqueous solution of a basic or basic-reacting compound. By effecting the reaction in this manner, the halohydrin ether is dehydrohalogenated to produce the epoxide ether, which, due to the elevated temperature employed, is recovered as an overhead fraction, usually in the form of a two phase azeotrope or constant boiling mixture with the evolved water vapors. This method, however, is frequently undesirable and sometimes inoperative. For example, some of the epoxide ethers are highly water soluble thereby rendering it impossible to recover these epoxide ethers by the aforementioned method of dehydrohalogenation of the corresponding halohydrin ethers with aqueous basic compounds, followed by the azeotropic distillation of the produced epoxide ethers. Also, the use of dilute aqueous solutions of the basic or basic-reacting compounds necessitates the employment of large and cumbersome installations, thereby increasing the initial and operating costs.

It is, therefore, one of the main objects of the present invention to provide a novel process which will avoid the above and other defects. A further object is to provide a process whereby halohydrin ethers may be readily converted to the corresponding epoxide ethers which may be readily and efficiently recovered from the reaction mixtures produced. Another object of the invention is to provide a practical and economical process which is adapted to the technical scale production of epoxide ethers from the corresponding halohydrin ethers.

The above and other objects of the invention may be accomplished by the process of the invention which in its broadest aspects comprises reacting halohydrin ethers at subatmospheric temperatures, i. e. below about 20° C., with concentrated basic or basic-reacting compounds, and selectively extracting the produced epoxide ethers from the resulting reaction mixture. It has been further discovered that, contrary to expectations, very high yields of the desired epoxide ethers may be obtained by effecting the dehydrohalogenation of the halohydrin ethers, at subatmospheric temperatures which are below about 10° C. and preferably in the neighborhood of 0° C. or below. This low temperature, however, should be above the freezing or solidification point of the reactants and/or the reaction products. A particularly suitable temperature range for the dyhydrohalogenation with the concentrated basic or basic-reacting compounds is between about 0° C. and minus 25° C. However, somewhat higher and lower temperatures may be employed without materially changing the recoverable yield of the desired epoxide ethers.

The use of concentrated solutions of the basic or basic-reacting compounds, although not strictly necessary, is at least highly advisable since it increases the rate of dehydrohalogenation of the halohydrin ethers. Also, when concentrated solutions of the basic compounds are employed, it is possible to use relatively smaller reaction vessels to produce a given quantity of epoxide ethers. Finally, it is advantageous to use such relatively concentrated basic solutions since the use of dilute solutions necessitates the handling of large volumes during the epoxide ether extraction step.

A suitable basic compound is one which is capable of effecting the removal of at least one mol of hydrogen halide from one mol of the halohydrin ether treated, thereby effecting conversion of the halohydrin ether to the corresponding epoxide ether, i. e. an ether compound containing an epoxy oxygen linkage between two carbon atoms of the molecule. The basic compound may be any suitable basic metal compound such as metal oxides, hydroxides, carbonates, borates, etc., which are alkaline-reacting and capable of effecting the desired result. A preferred group of basic-reacting compounds includes the alkali- and alkaline-earth metal hydroxides and oxides. Also, suitable basic-reacting salts of strong bases and weak acids, such as the carbonates, borates, and the like, may be frequently employed. The following is an exemplary list of basic or basic-reacting compounds falling within the aforementioned classes of compounds which may be used to effect the dyhydrohalogenation according to the present process: NaOH, KOH, $Na_2O$, $K_2O$, CaO, $Ca(OH)_2$, BaO, $Ba(OH)_2$, $Mg(OH)_2$, $Al(OH)_3$, $Al_2O_3$, $Cd(OH)_2$, $Co(OH)_3$, $Fe(OH)_3$, $Pb(OH)_2$, PbO, Mn(OH)$_2$, Mn$_2$O$_3$, Ni(OH)$_3$, K$_2$CO$_3$, Na$_2$CO$_3$, KHCO$_3$, NaHCO$_3$, NaBO$_4$, Na$_2$B$_2$O$_4$, Na$_2$B$_4$O$_7$, Ca(BO$_4$)$_2$, Ba(BO$_4$)$_2$, CaB$_4$O$_7$, and the like. In general, the use of relatively stronger basic compounds, e. g. caustic alkali, is preferred since the rate of dehydrohalogenation is thereby speeded up.

Although the process may be conducted by commingling the desired or optimum quantities of the halohydrin ether and basic compound, it is preferable to effect the reaction by gradually introducing the basic-reacting compound, preferably as a concentrated aqueous solution thereof, into the halohydrin ether to be dehydrohalogenated. The reactants and the reaction mixture is to be maintained at the above-described subatmospheric temperatures, and, in order to obtain efficient reaction, it is advantageous to agitate the mixture throughout the period of time during which the alkali is added. Ordinarily, the amount of basic compound to be added should be such as to effect the desired removal of the hydrogen halide from the halohydrin ether treated. In fact, it is highly advisable to prevent the use of excess quantities of the basic compound, since the presence of the basic material in the reaction product, particularly when the temperature is raised for example to atmospheric, may cause undesirable side reactions with the formed epoxide ethers.

After the termination of the dehydrohalogenation reaction, the epoxide ethers may be effectively recovered from the reaction mixture by means of suitable water-immiscible solvents having preferential or selective solubility for the epoxide ethers. As such reference may be made to ethers, such as diethyl ether, diisopropyl ether, and the like, low-boiling saturated hydrocarbons, such as isopentane, and the like, aromatic hydrocarbons, for example, benzene, etc. Generally, these solvents should have a low boiling point which is different from that of the particular epoxide ether extracted thereby, so that these solvents may be readily fractionally separated from the produced extract phase. Although the extraction step may be effected at the subatmospheric temperatures employed during the dehydrohalogenation step, it is possible to use ordinary and even somewhat higher temperatures, particularly if care is taken to prevent the presence of excess basic-reacting material in the reaction mixture after the termination of the dehydrohalogenation reaction. Also, in some cases it is possible, and frequently even advantageous to effect the dehydrohalogenation reaction in the presence of at least some solvent so that the epoxide ethers (substantially as soon as formed) may be withdrawn from the aqueous phase, thereby decreasing side reactions and thus increasing the yield of the desired epoxide ethers. The extraction step may be effected in a batch, intermittent or continuous manner. Also, the reaction mixture may be extracted or treated repeatedly or in several stages to recover all or substantially all of the formed epoxide. The same or different solvents may be employed for this repeated extraction of the reaction mixture.

The invention is applicable broadly to the dehydrohalogenation of all halohydrin ethers, i.e. organic compounds having the general formula $$R_1-O-R_2$$

wherein R$_1$ is a saturated or unsaturated alkyl, aryl, aralkyl or cycloaliphatic radical which may or may not be substituted, and wherein R$_2$ is a substituted hydrocarbon radical containing at least one halogen atom and at least one hydroxyl radical directly attached to different carbon atoms which are preferably not more than once removed from each other. In other words, the essential grouping of the preferred radical R$_2$ may be designated either by the formula

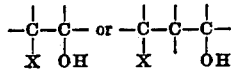

wherein X is a halogen. One group of halohydrin ethers which may be converted to the corresponding epoxide ethers according to the present invention, comprises compounds wherein the ether oxygen (i.e. the oxygen which is connected directly to two carbon atoms which are not otherwise connected) is attached to the carbon atom carrying the halogen atom or the hydroxyl group (whichever is closest to the ether oxygen) by means of at least one carbon atom.

The invention is particularly applicable to the dehydrohalogenation of halohydrin ethers wherein the radical containing the halogen atom and the hydroxyl group is a substituted or unsubstituted aliphatic hydrocarbon radical containing at least three carbon atoms in the chain. Of special importance is the dehydrohalogenation of allyl type halohydrin ethers since such a dehydrohalogenation produces a novel class of allyl type epoxide ethers, such as the allyl type glycidyl ethers, which are valuable compounds when employed as such and as intermediates, for instance, in the preparation of resins, as bactericides, insecticides, fungicides, etc.

The following is a representative list of epoxide ethers which may be effectively and economically produced and recovered according to the present process: Methyl glycidyl ether, ethyl glycidyl ether, n-propyl glycidyl ether, isopropyl glycidyl ether, amyl glycidyl ether, isoamyl glycidyl ether, vinyl glycidyl ether, allyl glycidyl ether, methallyl glycidyl ether, phenyl glycidyl ether, (5-methyl-2-isopropyl phenyl) glycidyl ether, (2,4,6-tribrom phenyl) glycidyl ether, p-tolyl glycidyl ether, o-tolyl glycidyl ether, m-tolyl glycidyl ether, alpha-naphthyl glycidyl ether, dinitrophenoxy propenoxide, 1,2-epoxy-4-ethoxy butane, 1-phenyl-1,2-epoxy-3-methoxy propane, 1,2-epoxy-5-methoxy pentane, (1,2-dihydroxy propane) glycidyl ether, cyclopentyl glycidyl ether, cyclohexyl glycidyl ether, methyl-cyclopentyl glycidyl ether, and the like, their homologues and analogues and substitution products.

The novel allyl type epoxide ethers are very valuable and useful substances, being employed, as stated above, as intermediates in the preparation of various chemicals and compounds, e. g. manufacture of resins, as ingredients in the preparation of insecticide, fungicide and bactericide compositions and in many other miscellaneous applications. By an allyl type epoxide ether is meant an organic epoxide ether which contains the following essential structure

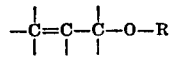

wherein R represents an organic radical containing an epoxide oxygen linkage between two vicinal or non-vicinal carbon atoms (which are however linked to each other by linkages other than through the epoxide oxygen). It is evident that in epoxide ethers of the allyl type, the ether oxygen atom is linked directly to a saturated carbon atom of the allyl type radical, which carbon atom is in turn directly linked to an olefinic or ethylenic group. The free bonds of the essential structure presented above are linked to such groups and atoms as hydrogen, alkyl, alkenyl, aryl, aralkyl, alicyclic, heterocyclic, alkoxy, aralkoxy, aryl oxy, and the like, together with these groups with one or more of their hydrogen atoms being substituted by halogen atoms, hydroxy groups, carbinol groups, carboxylic acid groups, amino groups and other suitable substituents. An aliphatic allyl type epoxide ether is one in which the free bonds of the above essential structure are taken up by hydrogen atoms and aliphatic hydrocarbon radicals. Of the above class of compounds, the novel allyl type glycidyl ethers have been found to be of particular interest and importance. A few examples of typical allyl type glycidyl ethers are: Allyl glycidyl ether, methallyl glycidyl ether, crotyl glycidyl ether, ethyl allyl glycidyl ether, dimethallyl glycidyl ether, and the like, and their homologues and analogues and suitable substitution products.

Reference will be had to the following specific examples which typify the preferred modes of executing the present invention, as well as the novel compounds which may be produced thereby. It is to be understood, however, that these examples are for illustrative purposes only, and that the invention is not to be limited thereby.

*Example I*

A mixture consisting of about 5 mols of epichlorhydrin and 25 mols of allyl alcohol was first cooled to a temperature of about minus 15° C., and to it was added about 0.03 mol of stannic chloride. The reaction initially was very vigorous. Thereafter, the mixture was boiled with total refluxing at the reflux temperature of allyl alcohol (93°–96° C.) for a period of about 32 hours. At the end of this period the reaction mixture was subjected to a distillation in the presence of a sufficient quantity of sodium carbonate to neutralize the stannic chloride catalyst. After removal of the excess allyl alcohol as the overhead fraction, the remaining concentrate was introduced into a 2-liter flask, and a total of 395 cc. of 13N sodium hydroxide was slowly added over a period of two hours. During this addition the contents of the flask were constantly maintained in a state of agitation and at a temperature of between about −2° C. and +2° C.

After the addition of all of the sodium hydroxide, the mixture while still maintained at the aforementioned low temperature, was stirred for an additional 5 hours, after which the reaction mixture was extracted six times with 150 cc. portions of diisopropyl ether. The extract phases from these extractions were then combined and fractionated to recover allyl glycidyl ether of the formula

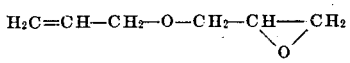

The yield was approximately 76.7%. The properties of this novel ether were as follows:

Boiling point _____ 87.5°–88.0° C. at 80 mm. mercury
Specific gravity, 20/4 ___ 0.9678
Refractive index, 20/D _ 1.4345
Carbon, per cent _____ 63.14 (Theoretical—63.2)
Hydrogen, per cent ____ 8.88 (Theoretical—8.77)
Bromine number _____ 141.5 (Theoretical—140)
Ring titration, per cent_ 101.1 (Theoretical—100)

The above yield of the allyl glycidyl ether could be greatly increased by improving the handling methods used as well as by eliminating certain mechanical losses which occurred during the operation of the above-described run.

*Example II*

About 373.5 grams (3 mols) of methyl ether of glycerine monochlorhydrin formed by the reaction of methyl alcohol and epichlorhydrin, together with about 250 cc. of diethyl ether, were placed in a flask and the mixture cooled to a temperature of about minus 10° C. While maintaining the temperature and while agitating the mixture, about 227 cc. about (3 mols) of 13N sodium hydroxide were added slowly over a period of about two hours. After completion of the reaction, the aqueous layer was separately removed, and was then extracted seven times with 125 cc. portions of diethyl ether. The extract phases were combined and fractionally distilled. The yield of methyl glycidyl ether was about 91.6%. An analysis of the bottom fraction showed that it contained about 8% of the employed methyl ether of glycerine monochlorhydrin. This unreacted chlorhydrin may be further treated in accordance with the present process to increase the total yield of the desired methyl glycidyl ether.

*Example III*

About 373.5 grams (3 mols) of methyl ether of glycerine monochlorhydrin were cooled to a temperature of about minus 20° C., and 277 cc. of 13N sodium hydroxide were slowly added with stirring and while maintaining the above low temperature. After separation of the lower layer thus formed, it was extracted eight times with 125 cc. portions of diethyl ether. After combining all of the extract phases, the mixture was distilled. The yield of methyl glycidyl ether was about 93.0%, the bottoms containing about 4% of the employed monochlorhydrin ether.

*Example IV*

Methyl ether of glycerine monochlorhydrin was treated substantially in the same manner as in Example III. However, in this experiment the reaction temperature was maintained at about 0° C., and 17N sodium hydroxide was employed instead of the 13N NaOH used in the above example. The yield of methyl glycidyl ether was 96.8%, based on the chlorhydrin ether employed. The bottoms contained only about 1.8% unreacted primary material.

*Example V*

In order to show the advantages of effecting the dehydrochlorination at the low temperatures, methyl glycidyl ether was prepared employing the same method as that used in Example IV, except for the fact that the reaction temperature was maintained at about 25° C. The yield of methyl glycidyl ether dropped to 87.7% (as compared to a yield of 96.8% when the reaction was effected at 0° C.). The bottom fraction contained about 3.2% of the primary material as unreacted methyl ether of glycerine monochlorhydrin.

Although the above examples are directed to the conversion of chlorhydrin ethers to the corresponding epoxide ethers, the process is applicable to the production of the epoxide ethers from halohydrin ethers broadly. For example, bromhydrin ethers and iodohydrin ethers may be employed in the process of the invention. Also, the novel class of allyl type epoxide ethers, such as the allyl type glycidyl ethers, may be produced by the described process, as well as by other processes, by the dehydrohalogenation of the corresponding allyl type halohydrin ethers. Also, the alicyclic epoxide ethers, such as cyclopentyl epoxide ether, may be produced by the dehydrohalogenation of the corresponding chlorhydrin ethers, bromhydrin ethers or other halohydrin ethers.

We claim as our invention:

1. Allyl glycidyl ether.
2. Methallyl glycidyl ether.
3. A compound having the general formula R—O—R₁ wherein R represents the allyl radical and R₁ represents a hydrocarbon chain to which an epoxy oxygen is attached to two carbon atoms not more than once removed from each other.
4. A compound having the general formula R—O—R₁ wherein R represents the methallyl radical and R₁ is a hydrocarbon chain to which an epoxy oxygen is attached to two carbon atoms not more than once removed from each other.
5. A compound having the general formula

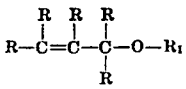

wherein R is an alkenyl hydrocarbon radical containing the olefinic linkage in beta position with respect to the ether oxygen atom to which the glycidyl radical is attached.

6. A compound having the general formula

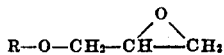

wherein R₁ represents a constituent selected from the class of the glycidyl radical and a hydrocarbon substituted glycidyl radical, and wherein each R represents a substituent selected from the group consisting of hydrogen and the alkyl hydrocarbon radicals.

7. A compound having the general formula

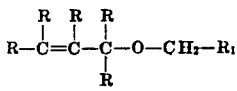

wherein R₁ represents a hydrocarbon chain to which an epoxy oxygen is attached to two carbon atoms not more than once removed from each other, and wherein each R represents a substituent selected from the group consisting of hydrogen and the alkyl hydrocarbon radicals.

8. A compound having the general formula

wherein R₁ represents a hydrocarbon radical to which an epoxy oxygen is attached to two carbon atoms not more than once removed from each other, and wherein each R represents a substituent selected from the group consisting of alkyl hydrogen and the hydrocarbon radicals.

9. The compound of the general formula

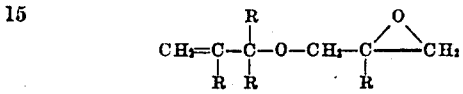

wherein each R represents a radical of the group consisting of hydrogen and the alkyl hydrocarbon radicals.

10. A process for the production of allyl glycidyl ether which comprises reacting the alpha-monoallyl ether of glycerine monochlorhydrin with a concentrated aqueous solution of sodium hydroxide at a temperature in the range of from —25° C. to 0° C.

11. A process for the production of allyl glycidyl ether which comprises reacting an alpha-monoallyl ether of a glycerine monochlorhydrin with a concentrated aqueous solution of an alkali metal hydroxide at a temperature in the range of from —25° C. to 0° C.

12. A process for the production of an alkenyl glycidyl ether which comprises reacting an alpha-mono-alkenyl ether of a glycerine monochlorhydrin with a concentrated aqueous solution of an alkali metal hydroxide at a temperature in the range of from —25° C. to 0° C.

13. A process for the production of an alkenyl glycidyl ether which comprises reacting an alpha-mono-alkenyl ether of a glycerine monohalohydrin with a concentrated aqueous solution of an alkali metal hydroxide at a temperature in the range of from —25° C. to 0° C.

THEODORE W. EVANS.
KENNETH E. MARPLE.
EDWARD C. SHOKAL.